Sept. 30, 1969 J. BOYCE 3,469,691
AERODYNAMIC SORTING
Filed Dec. 6, 1967 4 Sheets-Sheet 3
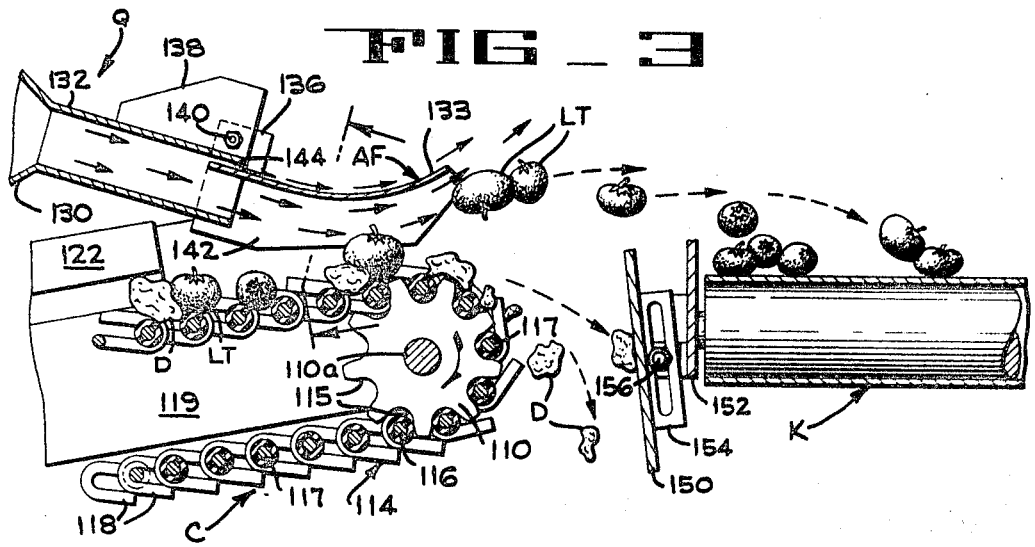
FIG_3
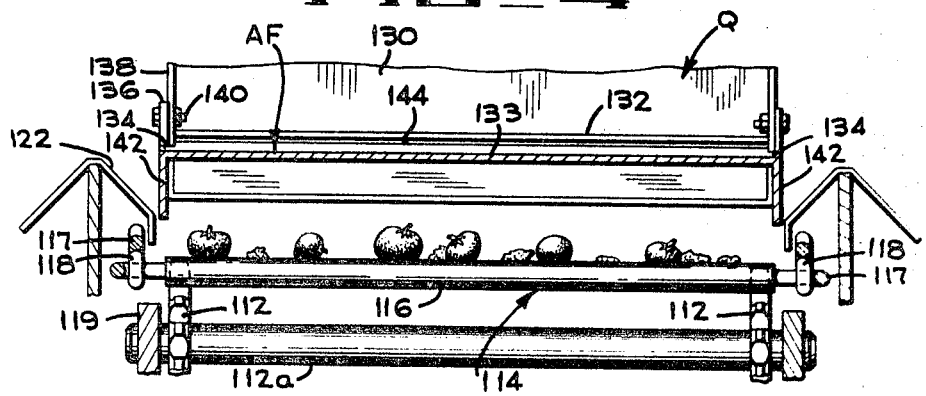
FIG_4
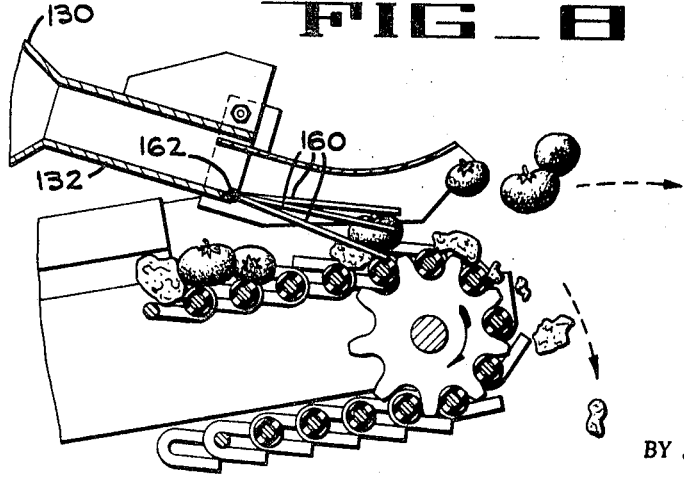
FIG_8
INVENTOR.
JOHN BOYCE
BY F. W. Anderson
C. E. Tripp
ATTORNEYS

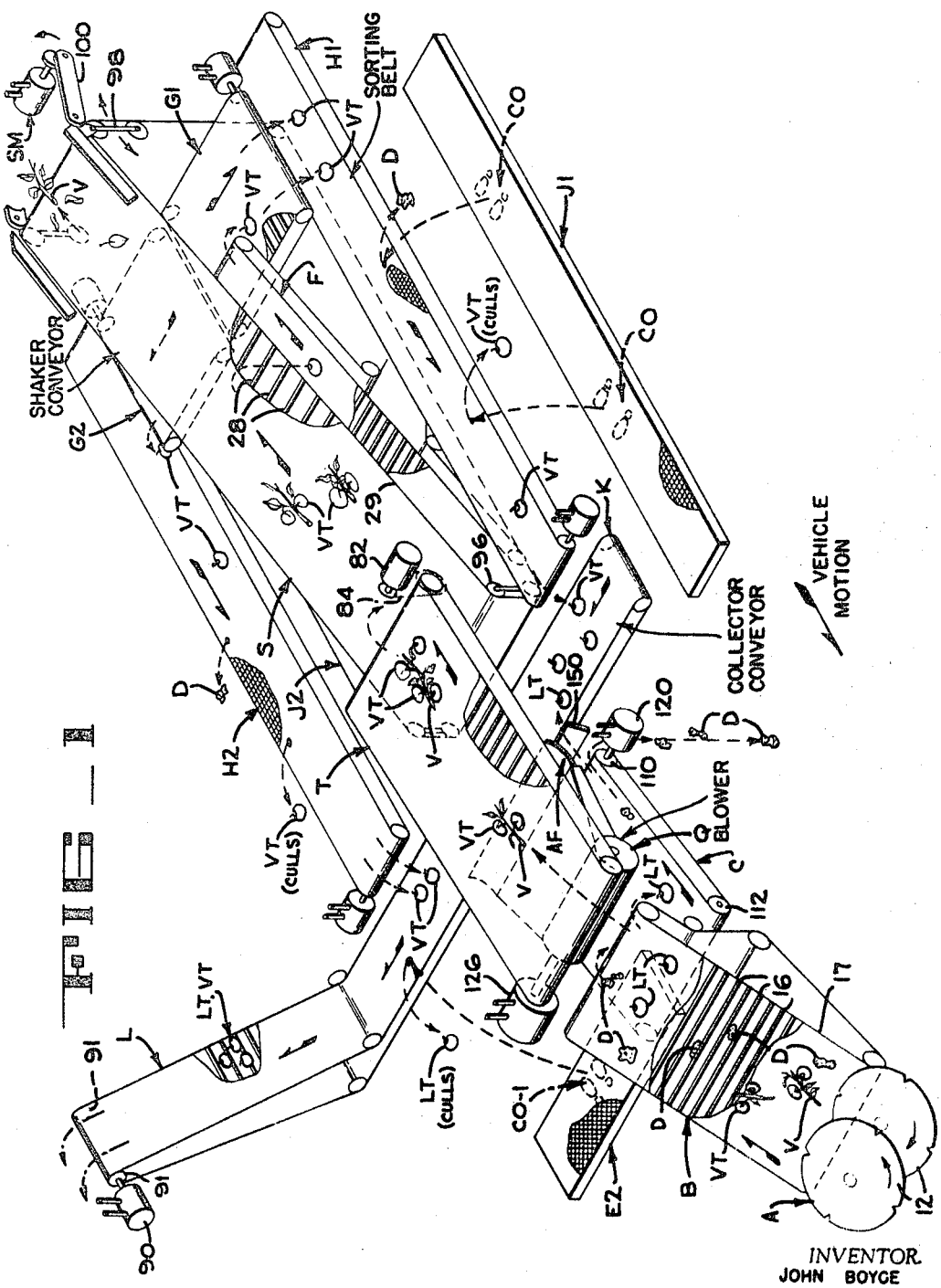

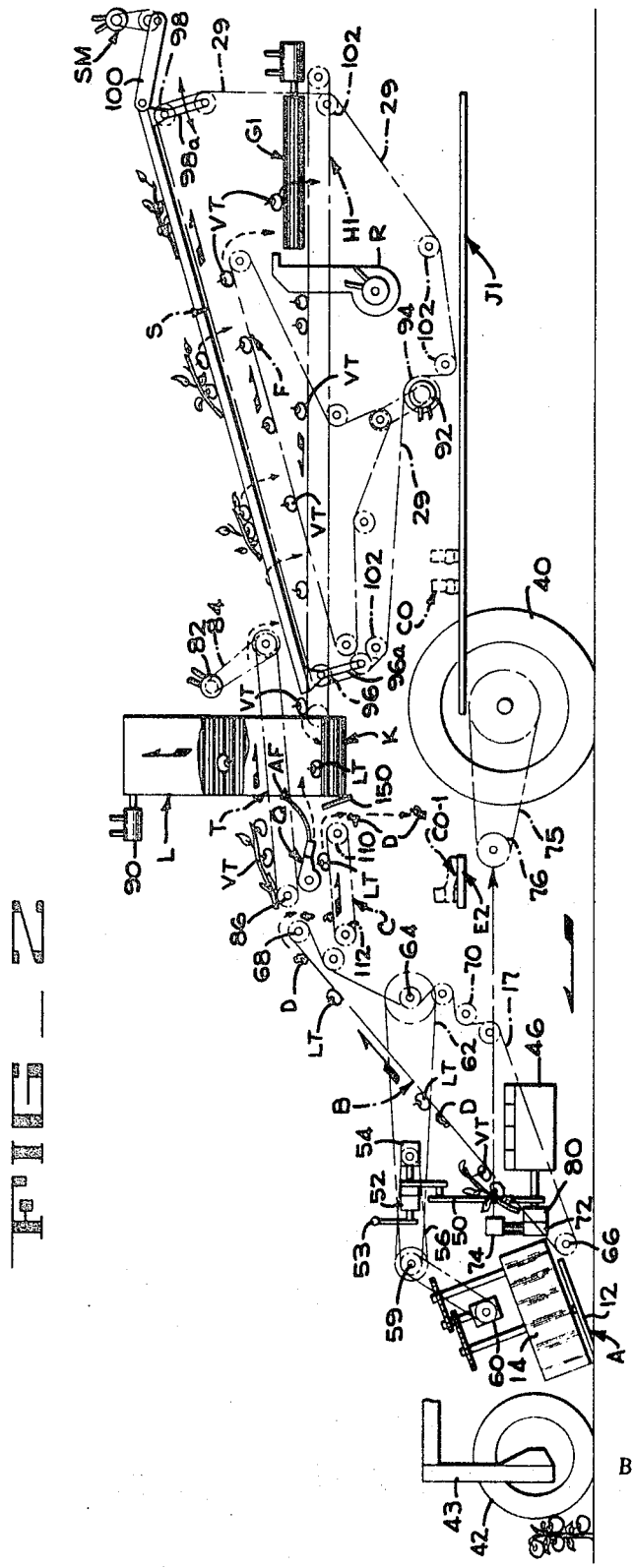

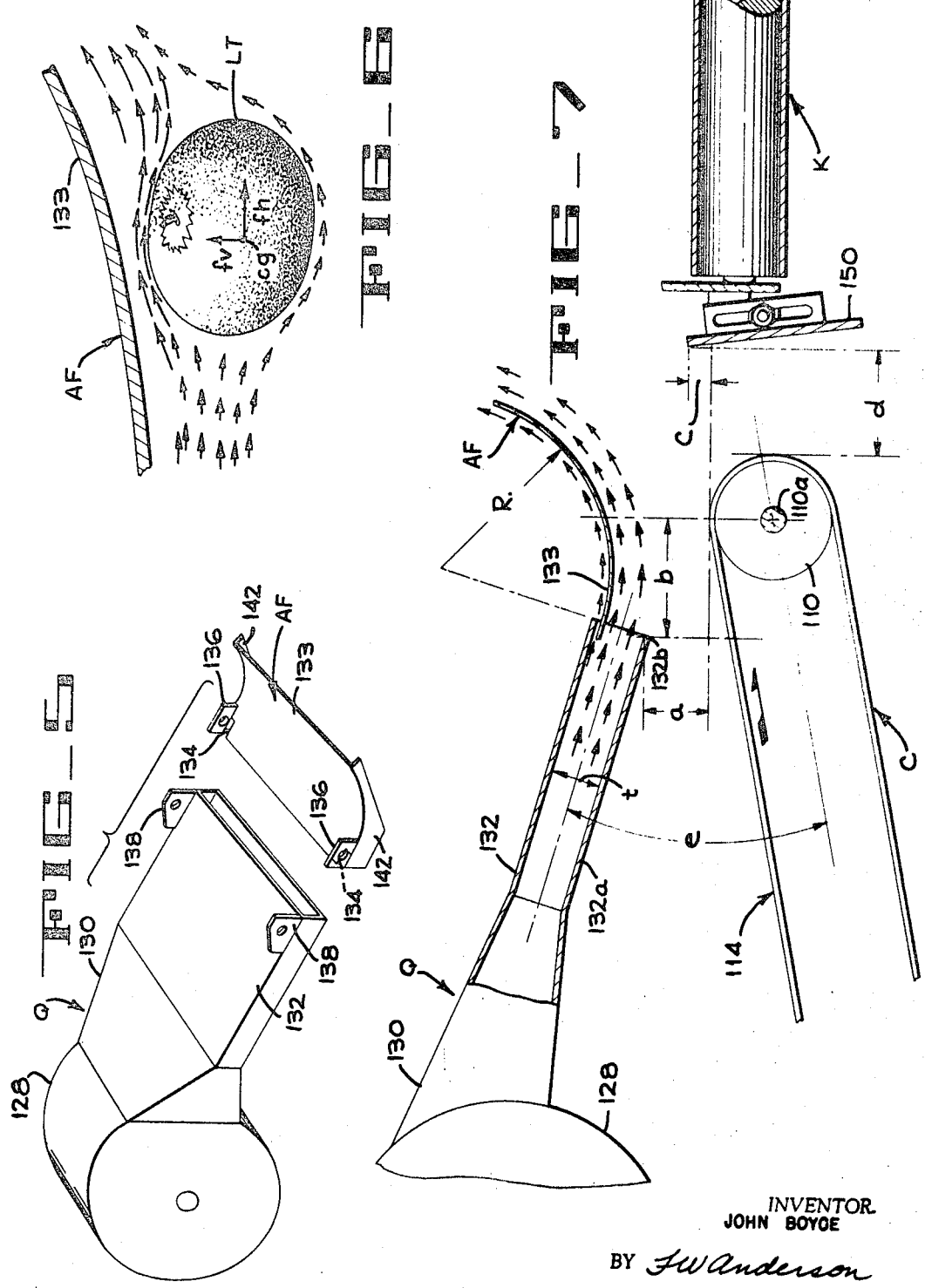

United States Patent Office 3,469,691
Patented Sept. 30, 1969

3,469,691
AERODYNAMIC SORTING
John Boyce, San Jose, Calif., assignor to FMC Corporation, San Jose, Calif., a corporation of Delaware
Filed Dec. 6, 1967, Ser. No. 688,484
Int. Cl. B07b 7/01, 7/00
U.S. Cl. 209—133                 15 Claims

ABSTRACT OF THE DISCLOSURE

Apparatus and method for separating smooth objects from rough contoured objects. A slatted endless conveyor has its discharge end spaced from a receiving conveyor. A blower nozzle and curved deflector are positioned to direct a stream of air over the discharge end for aerodynamically lifting and carrying the objects across the space and to the receiving conveyor. The rough contoured objects are not so lifted and fall through the space.

BACKGROUND OF THE INVENTION

Field of the invention

The present invention includes an improved tomato harvester as well as encompassing improvements in the separation of fruit such as tomatoes and other smooth objects from clods of dirt or the like, gathered up with the fruit. The separation method and apparatus of the present invention will be described in connection with its application to the improved tomato harvester.

Description of the prior art

A tomato harvester embodying the present invention is of the type wherein growing tomato vines and attached tomatoes, as well as loose tomatoes, are gathered up in the field and placed onto a feeder conveyor. This mass of material includes vine attached tomatoes, loose tomatoes, clods of dirt and other material. The loose tomatoes and clods of dirt, etc., are first separated en masse from the vines and their attached tomatoes, the latter continuing on through the machine to a shaker conveyor. At the shaker conveyor, the vine-attached tomatoes are shaken free and the bare vines carried clear of the machine. The tomatoes shaken from the vines at the shaker conveyor are taken to longitudinally running side sort conveyors wherein the cull tomatoes are removed by shaker sorting operators. The good tomatoes detached by the shaker remain on the longitudinal sorting belts and are conveyed to a collecting conveyor running laterally of the machine.

The loose tomatoes which were separated out from the mass (along with clods) ahead of the shaker are separated from their clods, and the good loose tomatoes are also carried out of the machine by the collecting conveyor that receives the tomatoes shaken from the vines. Loose tomato sorting operators are required for this loose tomato-clod separation.

A machine of this type is disclosed in the application of Csimma, Patent No. 3,340,935, filed July 30, 1964, assigned to FMC Corporation and the tomato harvester embodying the present invention is an improvement over the aforesaid Csimma machine. In the Csimma tomato harvester what is known in the trade as a "dirt belt" is provided adjacent the laterally running collector conveyor mentioned above, and the loose tomatoes and dirt clods, etc. drop onto the dirt belt ahead of the shaker. The loose tomato sorting operators referred to above examine this agglomeration of loose tomatoes and clods running past on the dirt belt, and transfer the good loose tomatoes from the dirt belt for eventual removal by the collector conveyor. The clods and cull loose tomatoes run off the end of the dirt belt onto the ground.

Under conditions of operations of the Csimma harvester just described, not only is a dirt belt required for removing clods of dirt and culled loose tomatoes, but loose tomato sorting operators are required at the dirt belt in order to transfer the *good* loose tomatoes on that belt to the collector conveyor system. As a result, if the crop is one wherein a majority of the tomatoes picked up fall loose onto the dirt belt, or wherein most of the loose tomatoes happen to be marketable, the loose tomato sorting operators at the dirt belt must manually transfer a majority of the crop from the dirt belt to the collector conveyor system. Only a minority of the loose tomatoes may represent culls, and hence need not be handled by these sorting operators.

SUMMARY OF THE INVENTION

In a harvester embodying the present invention, the dirt belt is eliminated and the loose tomato sorting operator need only handle cull tomatoes by throwing them off the collector conveyor. These harvesters are not normally operated until a majority of the tomatoes are ripe. Thus, in operation on a normal crop, the loose tomato culling operators need *not* handle the majority of the loose tomatoes separated out ahead of the shaker. Thus, both sets of sorting operators, those for the loose tomatoes and those for tomatoes shaken from the vines, need only throw off *cull* tomatoes at their respective stations.

The advantages just described are obtained by employing a specially constructed and arranged air blower system, which acts in conjunction with a generally horizontal loose materal conveyor and is disposed adjacent a laterally running collecting conveyor. The loose tomatoes and clods of dirt which drop off the end of the feeder conveyor ahead of the shaker conveyor are presented by the horizontal section of an endless belt lead-in conveyor to a stream of air flowing along the upper portion of the end section of the head-in conveyor. The generally horizontal air stream acts both directly and aerodynamically on the smooth, round tomatoes and thus increases the horizontal component of the trajectory imparted to the tomatoes initially by the conveyor. The air stream has little lifting effect on irregular rough objects such as clods of dirt, so that the horizontal component of the trajectory of the clods of dirt is considerably shorter than that of the tomatoes, Since the apparatus just described is placed adjacent the laterally running collector conveyor, the latter can be readily positioned so that tomatoes, and only tomatoes, have a trajectory that termniates on the collector conveyor. Only loose culls need be removed from the collector conveyor, this being done by the loose tomato sorting operators.

A gap is provided between the generally horizontal lead-in conveyor that presents the material to the air blower and the collector conveyor, and it is through this gap that the nonaerodynamic, heavy material (such as clods of dirt or the like) fall to the ground. Thus, sorting operators stationed at the collector conveyor need only cull loose tomatoes as they are deposited on the collecting conveyor by the blower, leaving the good loose tomatoes free to pass on and out to the produce wagon. These operators can also remove cull tomatoes and dirt clods overlooked by the shaker sorting operators at the side sort conveyors. As mentioned above, in the cases where the majority of the loose tomatoes are ripe and acceptable, the loose tomato culling operators need only handle a relatively few culls, in contrast to transferring all the good tomatoes from a dirt belt to the collector conveyor, as in the aforesaid Csimma machine.

Referring to the aerodynamic separation portion of the invention in more detail, the stream of air from the blower is directed so that it has an upper boundary a downwardly convex (upwardly curving) air foil or baffle plate. The lead-in conveyor that conveys the loose material to the blower, terminates underneath the air foil and the stream of air from the blower flows between the generally horizontal delivery end of the conveyor and the air foil, the latter causing the air stream to veer upwardly. The high velocity air flow passes over the smooth top surface of the tomatoes and a lower pressure area is produced. This results in an upward force component on the tomato which lifts the tomato off the conveyor and carries it for a brief time in the air stream. During this time the horizontal velocity of the tomato increases rapidly. When the air flow veers upwardly and becomes more turbulent, the lift component is reduced. This combined with the inertia of the tomato and the force of gravity causes the tomatoes to separate from the air stream. The tomatoes then continue on a relatively high trajectory to the collecting conveyor. This is in accordance with Bernoulli's law, that in a flowing fluid, an increase in the velocity head results in a corresponding decrease in the static (pressure) head.

Due to the rough contour and resulting turbulent flow over the dirt clods very little lift component is developed, the clods do not lift into the air stream and they gain very little horizontal velocity.

The result is that the clods drop off the end of the conveyor in a low trajectory falling short of the tomato's collecting conveyor.

As is well known, any two objects, given an initial horizontal velocity and permitted to under fall gravity will have a trajectory, the length of which, in the horizontal plane, is a function of the length of time that the objects are in the air. As previously explained, under the present invention, by providing an aerodynamic lift component on tomatoes and not on clods, the rate of fall of the tomatoes is actually diminished, thereby giving them a longer horizontal trajectory.

It is also true that if one object has a horizontal velocity component that exceeds that of the other, the first object will advance farther than the second in a given horizontal plane intersecting the objects' descent. The air stream, acting generally horizontally, increases the horizontal velocity of both the clods and the tomatoes, but since the tomatoes have the smaller specific gravity, they will have the greater velocity increase. These factors cooperate to make it possible to arrange the parts described so that the trajectory of tomatoes is intercepted by the collector conveyor, whereas the clods, etc., will have already fallen to positions that are lower than the plane of the collector conveyor before they can possibly reach the latter in a horizontal direction.

It is this simple form of automatic separation of the tomatoes from other material that not only provides an effective separation without need for sorting or culling operators, but further simplifies and improves the operation of a tomato harvester of the type referred to when this type separator is installed on the harvester.

The aerodynamic separation feature of the present invention is not specifically limited to the improved harvester combination described earlier, because a mass including clods and fruit could be fed to a lead-in conveyor and blower assembly of the type described, and separation would be effected.

BRIEF DESCRIPTION OF THE DRAWINGS

FIGURE 1 is a diagrammatic perspective showing a tomato harvester embodying the invention.

FIGURE 2 is a schematic side elevation of the harvester showing various drives.

FIGURE 3 is an enlarged fragmentary section through the air separation station.

FIGURE 4 is a section taken on line 4—4 of FIGURE 3.

FIGURE 5 is a perspective of the blower.

FIGURE 6 is a diagram showing the aerodynamic action on a tomato.

FIGURE 7 is a diagram showing certain key dimensions at the separation station.

FIGURE 8 is a view like FIGURE 3 illustrating a modified form of the separation station.

GENERAL DESCRIPTION OF THE HARVESTER

As mentioned, the aerodynamic separation of the present invention is particularly advantageous when fitted to a tomato harvester, and will be so described in the detailed description of the invention that follows.

The general arrangement of the frame structure, the wheels and their mounting, the construction and mounting of the cutting discs and the undulating side delivery belts, as well as various mechanical drive elements for these parts and for the feeder conveyor, are all described in detail in the aforesaid Csimma application, Patent No. 3,340,935. They are further described in the copending application of Manfre, Ser. No. 572,827, filed Aug. 15, 1966, and also assigned to the FMC Corporation. Many of these mechanical details are not critical to the present invention and hence will not be described in detail in this specification.

In the embodiment of the herein shown, only the feeder conveyor is chain driven, the other conveyors such as the transfer, shaker, sorting and collector conveyors are driven by hydraulic motors, as described in the copending application of Boyce, Ser. No. 633,937, filed Apr. 26, 1967, and assigned to the FMC Corporation. The aforesaid pending applications are incorporated herein by reference for a disclosure of mechanical designs suitable for the construction of a harvester that embodies the present invention.

The basic units of the tomato harvester, insofar as they are critical to the improvement represented by this invention will now be briefly described, somewhat in the sequence of the flow of the crop through the harvester, although this is actually a two-branch flow. As the harvester moves down the field, the pickup assembly A, FIGURES 1 and 2, severs growing vines and picks them up, along with their attached tomatoes, as well as picking up loose tomatoes lying on the ground. The pickup assembly is described in more detail and claimed in the application of Greedy, Patent No. 3,330,363, filed Dec. 13, 1964, and assigned to the assignee of the present invention. It includes a pair of rotating notched cutting wheels 12, which are normally set so that their leading edges scrape along beneath the surface of the ground. The crop thus picked up is advanced rearwardly by a pair of undulating side belts 14 shown in FIGURE 2, it being understood that the details of the pickup mechanism are not critical to the invention, and other vine severing and pickup mechanisms can be used.

The mass of vines with attached tomatoes, loose tomatoes, and incidental dirt and clods is advanced onto a feeder conveyor B which is formed of rods 16 connected at their ends to side chains 17. FIGURE 1 illustrates diagrammatically how the vines V, vine-attached tomatoes VT, loose tomatoes LT and clods of dirt D are all conveyed and elevated by the feeder conveyor B.

In the first flow branch through the harvester, the vines V and their attached tomatoes VT are carried over or transferred from the feeder conveyor B to a transfer conveyor T. The transfer conveyor is constructed and driven in the manner described for the transfer conveyor T of the aforesaid Boyce application, these details not being critical to the present invention.

The vines V and the vine attached tomatoes VT are conveyed along the transfer conveyor T and are dropped off onto a shaker conveyor S. This conveyor has relatively widely spaced slats 28, so that vine attached tomatoes VT, shaken from the vines, will fall between the slats. Thes slats 28 are connected to side chains 29 in the usual manner. A shaker mechanism SM is connected to longitudinally reciprocate the upper reach of the shaker conveyor, in the manner described in the aforesaid Boyce application.

Tomatoes VT, detached from the vines by the shaker conveyor, drop between the slats 28 onto an undershaker conveyor F, which conveys the detached tomatoes VT until they drop off the delivery end of the undershaker conveyor and fall onto one or the other of a pair of laterally running, rear collecting conveyors G1, G2.

In order to bring the vine attached tomatoes VT into position for inspection by the side culling or sorting operators, longitudinally running side sort conveyors H1, H2 are provided, this construction also being present in the machine of the Csimma patent, previously mentioned. The side sort conveyors H1, H2 are composed of conventional rubberized fabric belting, and run along inside of longitudinal sorting platforms J1, J2. Culling operators CO whose footprints are indicated on the rear platform J1, inspect the detached tomatoes VT, running on the side sorting belts H1, H2 and manually throw off the green or cull tomatoes, leaving the good tomatoes on the side sort conveyors. These operators can also throw off clods of dirt D, vine fragments, and other trash reaching the side sort conveyors. Thus, the good detached tomatoes VT fall off the ends of the side sort conveyors H1, H2 and onto a laterally running collector conveyor K, and are then carried via an elevator conveyor section L into bins or trucks as market tomatoes. The vines V are carried up off the end of the shaker conveyor S and are dropped back onto the ground.

As seen in FIGURE 2, a blower R is provided so as to assist in blowing vines and trash clear of the rear collecting conveyor G1, G2, although this blower is not a feature of the present invention.

The first flow branch through the harvester, which handles the vine attached tomatoes has been described. The present invention is an improvement over the harvesters of the aforesaid Boyce application and Csimma patent, relative to the second flow branch through the harvester, namely, the flow of loose material.

Clods of dirt, rocks, etc. indicated at D, and loose tomatoes LT (both market and cull tomatoes), fall off the end of the feeder conveyor B, and onto a lead-in conveyor C which presents this material to a separator blower Q, which, as will be explained in detail imparts separate trajectories to the loose tomatoes LT and to the clods D, etc. The tomato trajectory terminates on the laterally running collector conveyor K, whereas the clods of dirt D fall to the ground.

General mechanical details of the harvester

Before describing in detail the improved separating action in the harvester of the present invention, reference will now be made to the general construction, certain mechanical details, and the operation of a tomato harvesting machine that embodies the invention. Reference is made to the aforesaid Boyce application for a more complete description of these parts, which are not per se critical to the present invention.

As previously indicated, this is a mobile harvester which is driven through the field, and the machine illustrated has cutters of a type that are particularly adapted to harvest row crops. However, it is to be understood that the present invention is not limited to use in harvesting row crops, because other type pickup devices suitable for broadcase harvesting can be employed and are contemplated. In the machine illustrated herein as exemplifying a harvester embodying the invention, a pair of rear drive wheels 40 is provided, and in typical operation these drive the harvester along the ground at about 70 feet per minute. A more detailed description of a suitable mounting wheel mounting are not critical to the invention, and a suitable design is shown in the aforesaid application of Greedy, Patent No. 3,330,363.

The notched cutting wheels 12 sever the vines beneath the ground and pick up the vines with attached and loose tomatoes. The cutting wheels are mechanically operated at a peripheral speed of approximately 250 feet per minute. Opposed undulating side belts 14, which assist in conveying the vines and loose tomatoes as they pass onto the feeder conveyor B, are driven by chain and sprocket gearing at a linear speed of approximately 70 feet per minute, in the example herein given.

Front end drives

The front end material handling portions of the harvester, as well as the vehicle itself, are driven by an internal combustion engine 46 which operates a sprocket chain drive 50 for turning the driven element of a clutch 52, which clutch can be engaged by a manual lever 53 to cut in the front end mechanism. The clutch output shaft drives through a right angle gear box 54 to turn a sprocket chain drive mechanism 56 and a countershaft 59. The latter, through a sprocket chain drive and a right angle gear box 60 drives the shafts of the cutters 12 and side belts 14, more fully described in the aforesaid Csimma application.

Feeder conveyor

In order to drive the feeder conveyor B, a sprocket chain drive 62 (FIG. 2) is operated from the same countershaft 59 which drives the cutters and side belts 14. Drive chain 62 turns a countershaft 64 which mounts conveyor chain drive sprockets that engage the side chains 17 of the conveyor B. The chains are trained around entry and exit sprocket shaft assemblies 66, 68 and around various idler pulleys, a pulley 70 being an adjustable takeup pulley. The exit pulley 68 can be adjustably mounted if it is desired to incorporate the transfer features of the aforesaid Boyce application into the harvester. The drives are such that when the harvester is operated along the ground at a linear speed of about 70 feet per minute, the feeder conveyor B will be operated at a linear speed of about 72 feet per minute. This somewhat higher speed of the feeder belt compensates for its inclination and insures that the mass of gathered material will not be crowded on the feeder conveyor.

The drive wheels 40 are also driven from the internal combustion engine 46, but in the harvester illustrated the drive is hydraulic. The details of this drive are not critical to the present invention and it need only be stated that a hydraulic pump 72, operated by the engine shaft, is connected to a hydraulic system indicated schematically by two pipes connected to a hydraulic motor 74. Through gearing, not shown, the hydraulic motor turns wheel driving sprockets 76, which sprockets may be driven through differential gearing, not shown, on their shafts. Sprockets 76, by means of sprocket chain drive 75, turn the rear wheels 40 individually.

Hydraulic material handling drives

The material handling drives now to be described are all operated by hydraulic motors in a hydraulic system such as that described in the aforesaid Boyce application. It is to be understood at this point that the hydraulic system for driving the various conveyors is not, in and of itself critical to the invention and conventional hydraulic engineering design is employed.

As seen in FIGURE 2, a second hydraulic pump 80 is operated from the engine shaft and supplies oil under pressure for driving the various hydraulic motors to be mentioned. The transfer conveyor T is driven by a hydraulic motor 82 through a chain and sprocket drive 84, which drives the side chains of the transfer conveyor. If the invention of the aforesaid Boyce application is incorporated into the machine, the material receiving end of the transfer conveyor passes around an adjustably mounted idler sprocket shaft assembly 86. The transfer conveyor T is operated, in the example being given, at a linear speed of approximately 75 to 80 feet per minute.

The combined collector and tomato delivery conveyors

K, L are driven by a hydraulic motor 90 at the delivery end of the conveyor, driving sprockets 91 (FIG. 1) which engage the conveyor side chains. The collector conveyor is driven at a linear speed of 90 feet per minute, in the example.

The shaker conveyor S is driven by a hydraulic motor 92, which motor also supplies the power for the undershaker conveyor F. The motor 92 operates a pair of sprockets 94 (FIG. 2) for driving the side chains 29 of the shaker conveyor S. The side chains 29 are directed over an open path that accommodates the undershaker conveyor F beneath the upper reach of the shaker conveyor, and also permits shaking the upper reach of the latter. Thus, the side chains 29 of the shaker conveyor are trained over upper sprockets 96 and 98, which form the idler sprockets for the upper reach. These sprockets are longitudinally reciprocated by a shaker motor SM. A group of normally fixed idler sprockets 102 is also provided, to provide the necessary open path for the shaker conveyor side chains in the machine, as is clear from FIGURE 2. The gearing just described drives the shaker conveyor at a speed of approximately 81 feet per minute, and shakes it at about 220 cycles per minute.

The separation system

Referring to FIGURES 1 and 2, the separation system includes the lead-in conveyor C which receives loose tomatoes LT and clods of dirt D from the feeder conveyor B, an air blower and nozzle assembly Q, and an air foil plate AF at the discharge end of the nozzle. The collector conveyor K previously described acts as a receiver for the separated loose tomatoes LT. The lead-in conveyor C is inclined upwardly in its conveying direction slightly but the discharge end thereof at least is generally horizontal, as it passes around pulleys. This conveyor includes driving sprockets 110 and idler sprockets 112 over which is trained an endless belt 114. The endless belt has rubber covered flights 116. The flights are in the form of rubber covered transverse rods 117, the ends of the rods being bent into hooks 118 which are pivotally mounted on adjacent rods. This type of chain construction is conventional and is not critical to the present invention.

As seen in FIGURE 3, the driving sprocket 110 is notched at 115 to receive the rubber covered flights 116. The shafts 110a and 112a for the lead-in conveyor sprockets 110 and 112 rotate in side plates 119 (FIGS. 3 and 4) which plates are mounted on the frame of the harvester in a manner not shown in detail and not critical to the present invention.

The shaft 110a of the lead-in conveyor C is driven by a hydraulic motor 120 (FIG. 1). Side guard plates 122 confine the tomatoes and dirt on the conveyor as well as serving to guide the hook link portions 118 of the conveyor.

The blower Q is an ordinary centrifugal blower illustrated schematically in the perspective of FIGURE 5. The rotor of the blower (not shown) is driven by a hydraulic motor 126 (FIG. 1). The rotor housing 128 (FIG. 5) delivers air to a throat 130 which leads a nozzle 132 for directing a sheet of air over the delivery end of the lead-in conveyor C. The actual mounting of the blower Q to the frame is omitted from the drawings for clarity. The air foil AF is notched at 134 (FIGS. 4 and 5) to receive the side walls of the nozzle 132.

The air foil has upstanding ears 136 which are bolted to ears 138 projecting upwardly from the upper wall of the nozzle 132. The bolts 140 making these connections can be tightened to clamp the air foil AF in a selected angular position relative to the nozzle 132. The air foil AF has side flanges 142 (FIGS. 3 and 4) to confine the air so that the air stream beneath the air foil forms an effective continuation of the air stream leaving the blower nozzle 132. As seen in FIGURES 3 and 4 a gap 144 is provided between the curved plate 133 of the air foil and the upper wall of the nozzle 132. It has been found that this gap permits a small sheet of the air leaving the nozzle 132 to flow around the upper surface of the air foil plate 133 whereas the majority of the air leaving the nozzle follows the lower, convex (upwardly curving) surface of the air foil plate 133. By thus bleeding off some of the air on both sides of the upstream edge of the air flow plate 133, it has been found that turbulence at the transition zone between the nozzle 132 and air foil is minimized and a smooth streamline flow of air leaves the nozzle 132 and continues on around the underside of the curved plate 133 of the air foil.

In order to prevent clods of dirt D from being flung into the machine and insure that they fall to the ground, a deflector plate 150 (FIG. 3) is mounted on the side of the collector conveyor K that faces the lead-in conveyor C. The deflector plate 150 is adjustably mounted on a side frame member 152 of the collector conveyor by means of a slotted ear 154 welded to the plate and a clamp bolt 156 mounted on a bracket projecting from the side frame 152.

Operation

As seen in FIGURES 3 and 6, a stream of air indicated by the short solid arrows leaves the nozzle 132 and follows the contour of the air foil plate 133. This stream of air also is directed downwardly somewhat, against the upper surface of the tomatoes LT at the delivery end of the lead-in conveyor C. The tomatoes are smooth and of rounded shape so that they act as an air foil section and non-turbulent air flows in a streamlined fashion around the upper surfaces of the tomatoes. As a result of this air flow and the presentation of the tomatoes, the velocity of the air flow above the tomatoes substantially exceeds that of the air flowing beneath the tomatoes. This gives an initial lifting action to the tomatoes and frees them from the conveyor so that they are entirely in the air stream.

This differential in velocity between the air at the upper and lower surfaces of the tomato is now accentuated by presence of the air foil plate 133. The tomatoes act as a local restriction in cooperation with that plate so that the velocity of the air between the tomatoes and the plate is further increased. As indicated in FIGURE 6, the velocity of the air above the tomatoes T (as shown by the length of the arrows) is significantly greater than the air velocity below the tomato. This difference in velocities above and below the tomato is accentuated by the presence of the air foil plate 133. As a result of this differential velocity in the air flow, a differential air pressure is created, an in accordance with Bernoulli's law, the increase in velocity head of the air decreases the pressure head, so that a pressure differential is created vertically of the tomato. As a result, a vertical lifting force $fv$ is applied to the center of gravity $cg$ of the tomato. As a matter of fact, the air flowing below the tomato LT, due to the presence of the lead-in conveyor C, does not remain non-turbulent for any significant period of time, thereby further increasing the static pressure of the air tending to lift the tomato. The vertical lifting component $fv$ may be descriptively referred to as an aerodynamic force component. At first, $fv$ may be large enough to exceed the force of gravity so that the tomato is actually lifted during its initial movement thereof underneath the air foil plate 133.

In addition to the lifting force $fv$ a horizontal force $fh$ is exerted on the tomatoes by the air stream. Of course, the tomatoes also retain a horizontal velocity imparted thereto by the lead-in conveyor C. Thus, the two effects previously described on the tomatoes are produced. The aerodynamic force $fv$ retards the falling of the tomato and gives the horizontal motion and velocity of the tomato a longer time in which to act, and hence lengthens the trajectory of the tomatoes. The initial horizontal velocity of the tomatoes is also augmented by the horizontal force component $fh$ caused by the air stream. As a result, the tomatoes assume an arcing trajectory as seen in FIG- URE 3, and clear both the guard plate 150 and the side wall 152 and are deposited upon the collector conveyor K.

The debris consists primarily of clods of dirt and rocks D which are of rough texture and of irregular shape, and these objects do not generally experience an aerodynamic lifting force component. This is because the stream of air, when it impinges upon the upper side of a clod of dirt or rock, does not flow smoothly thereover, but instead, encounters protruding facets of the object which interrupt the flow. Thus, there is no large initial differential in the speed of the air on the upper and lower sides of the object. Also, the air flow across the clods is not laminar or a streamline flow, so that Bernoulli's law does not apply. Therefore, there will be no significant differential in the pressure of the air on the upper and lower sides of the object and, consequently, substantially no aerodynamic lift component of force acting thereon. The air foil baffle does not cooperate to produce a lift either. It merely acts as restriction to air flow over the rough clods and accentuates turbulence.

All objects on the conveyor have momentum imparted to them by the motion of the conveyor. This momentum tends to propel the articles towards the right (as viewed in FIG. 3) as they leave the conveyor for ejection into the discharge area. In addition, the tomatoes are lifted by the aerodynamic force component $fv$ (FIG. 6) and are propelled toward the right by the force $fh$ of the air stream leaving the nozzle 132. The rocks and clods of dirt, which generally are not lifted, are not propelled to the right (as viewed in FIG. 1) by the stream of air because these objects are held by the conveyor flights 116 until they are ejected therefrom. At the point of discharge of the debris from the conveyor, the air stream, which turns upwardly at the end of the conveyor, is too far above the clods and debris to have any significant propulsive effect thereon. Thus, the debris is affected primarily only by the momentum imparted thereto by the conveyor and is ejected into the portion of the discharge area to the left of the plate 150. The tomatoes, which are affected not only by momentum but by the horizontal propulsive and vertical aerodynamic force components resulting from the air stream are boosted over the plate 152, falling on the collector conveyor K.

Typical design

FIGURE 7 is a diagram illustrating some major geometric aspects of a typical design. The speed of the conveyor 114 is in the order of 200 feet per minute.

The throat height of the nozzle 132 is about two inches. The width of the nozzle 132 depends upon the width of the tomato harvester or other application of the devices and hence cannot be given. Sufficient horse power is supplied to the blower rotor in the housing 128 to provide an air stream having an adequate velocity to produce the desired results. Measured in terms of the decreased head due to the air velocity at the exit from the nozzle 132, the air velocity should be such as to produce a static head in the order of about 8 to 11 inches of water.

The vertical displacement $a$ of the lower wall 132$a$ of the nozzle 132 and the surface of the lead-in conveyor C at the roller 110 is given as about 2¾ inches.

The distance $b$ from the nozzle throat 132$b$ to the axis of the conveyor shaft 110$a$ sprocket 110 will be about 5 inches. The vertical displacement $c$ of the top of the shield plate 150 from the horizontal plane passing through the top of the discharge end of the lead-in conveyor C will vary from ½ inch above the discharge plane of the conveyor (the adjustment illustrated) to about 2½ inches below that plane.

The upper surface of the collector conveyor K can be as high as the plane intersecting the upper discharge surface of the conveyor C, or of course can be as much lower as desired because the tomatoes will merely fall after reaching the zone of the collector conveyor.

Since the tomatoes have a substantially augmented trajectory under the present invention, the distance $d$ between the discharge end of the lead-in conveyor C and the guard plate 150 is not critical. This dimension can be in the order of 4½ to 9 inches.

In the embodiment shown, the lead-in conveyor C although it is substantially horizontal is inclined upwardly somewhat and the axis of the air duct 132 is inclined downwardly. The upward inclination of the conveyor C is helpful in order to provide room for the blower, but is not significant and this conveyor could be substantially horizontal. However, an included angle $e$ between the blower axis and the delivery path of the lead-in conveyor C should be provided in order to cause air to impinge upon the tomatoes at the discharge of the conveyor C. This angle $e$ is in the order of 24 degrees, but this is not a critical value, particularly since the air foil AF can be adjusted to somewhat modify the direction of the air stream. In the design shown, the plate 133 of the air foil has a radius R of six inches.

Modified form

Occasionally a clod of dirt is similar enough in shape and/or texture to a tomato so that, if exposed long enough to the air stream, it will be lifted off the conveyor and pick up enough velocity from the air stream to be boosted over the guard plate 150 with the tomatoes. As shown in FIGURE 8, to prevent this, a plurality of fingers 160, or narrow shields, can be pivotally mounted side by side on a transverse rod 162, along the bottom edge of the duct nozzle 132. These fingers, which ride over objects carried on the conveyor C, prevent air from the air stream lifting the objects until the objects clear the fingers, close to the discharge end of the conveyor C. In the space from the ends of fingers 160 to the end of the conveyor C, only smooth and rounded objects, namely the tomatoes, will be lifted into the air stream and boosted over the guard plate 150. The fingers 160 also function to prevent excessive lifting action on the tomatoes by the air stream.

Although the best mode contemplated for carrying out the present invention has been herein shown and described, it will be apparent that modification and variation may be made without departing from what is regarded to be the subject matter of the invention as set forth in the appended claims.

I claim:

1. In a tomato harvester of the type wherein vines and tomatoes are gathered onto feeder conveyor means, the vines with their attached tomatoes pass over a discharge end of said feeder conveyor means and onto vine and shaker conveyor means for detaching the tomatoes from the vines, the tomatoes thus detached are transferred to collector conveyor means, and loose tomatoes and clods of dirt are discharged from said feeder conveyor means upstream of said vine and shaker conveyor means; the improvement comprising lead-in conveyor means running longitudinally from beneath the loose material discharge of said feeder conveyor means to a zone adjacent to but spaced from said collector conveyor means for receiving loose tomatoes and clods discharged from the feeder conveyor means, and blower means for directing a stream of nonturbulent air in the direction of said lead-in conveyor means movement and over the upper faces of the loose material at the discharge of said lead-in conveyor means for aerodynamically supporting and carrying the loose tomatoes across said space and onto said collector conveyor means, while the clods fall through said space and out of the harvester.

2. The tomato harvester of claim 1, wherein said blower means includes a downwardly inclined nozzle and a downwardly convex air foil is mounted at the discharge of said nozzle to form an upper boundary for the stream of air.

3. The tomato harvester of claim 2, wherein the upstream end of said air foil is spaced below the upper wall of said nozzle for providing laminar flow of air over the air foil.

4. The tomato harvester of claim 1, wherein said collector conveyor means includes a conveyor running laterally of the harvester for receiving loose tomatoes aerodynamically carried over from said lead-in conveyor means, said vine and shaker conveyor means including a transfer conveyor for vines and attached tomatoes that runs between said feeder and shaker conveyor means, and above both said lead-in and said laterally running collector conveyor means.

5. Apparatus for separating smooth rounded objects from a mixture of the smooth rounded objects and rough irregular objects, said apparatus comprising a conveyor for moving the mixture along a path for ejection into a discharge area, blower means above said conveyor for directing a stream of air in the general direction of conveyor motion, and including means for converting said stream of air into a laminar flow over said mixture, for exerting an aerodynamic lifting effect on the smooth rounded objects as they approach the conveyor discharge area for imparting a more elevated trajectory to the smooth rounded objects than to the rough irregular objects leaving the conveyor.

6. The apparatus of claim 5, in which said blower means includes a nozzle that directs the stream of air in a downwardly inclined direction along the conveyor, said air stream converting means comprising an upwardly curved air foil projecting from the mouth of said nozzle and over the discharge area of said conveyor for providing an upwardly curved, laminar booster stream of air for the smooth objects.

7. The apparatus of claim 6, wherein said air foil has depending side flanges for laterally confining the laminar stream of air.

8. The apparatus of claim 6, wherein a flexible shield is mounted over the conveyor and beneath said nozzle and the air foil, said shield stopping short of both the conveyor discharge and the air foil for initially shielding the objects on the conveyor from the lifting effect of the stream of air until after the objects have passed the shield.

9. The apparatus of claim 8, wherein said flexible shield comprises fingers pivotally about an axis that is transverse to the conveyor.

10. The apparatus of claim 6, wherein the upstream end of said air foil is spaced below the upper wall of said nozzle for providing laminar flow of air over said foil.

11. The apparatus of claim 6, wherein said conveyor comprises spaced transverse bars for restraining the rough articles from direct propulsion along the conveyor surface by the air stream.

12. Apparatus for separating smooth articles such as tomatoes, etc. from rough articles such as clods of dirt, etc., comprising a conveyor having a generally horizontal discharge section terminating in an article drop off zone, an air blower including a nozzle for directing a stream of nonturbulent air across the upper surfaces of articles on the discharge section of said conveyor, and downwardly convex, upwardly curving air foil means projecting from the upper end of said nozzle for providing an upwardly curved sheet of laminar flow air that continues lifting and propulsion action of the air stream on the smooth articles as they leave the conveyor, while the rough articles drop off the end of said conveyor.

13. The apparatus of claim 12, wherein the upstream end of said air foil is spaced below the upper wall of said nozzle for providing laminar flow of air above as well as below the air foil.

14. The method of separating smooth rounded objects from a mixture of smooth rounded objects and rough irregular objects by means of the differences between the aerodynamic effect of air flow over the rounded smooth objects and over the rough irregularly shaped objects, comprising the steps of spreading and supporting the mixture in a generally horizontal plane, providing a discharge area adjacent to the mixture, and directing a stream of nonturbulent air generally parallel to said plane and over said mixture of objects, and causing said stream of air to have a higher velocity over the top portions of the objects than over their under portions for lifting the smooth rounded objects into said discharge area without lifting the rough objects.

15. The method of claim 14, comprising the steps of initially advancing said articles by their support in the direction of air stream motion, and removing the support for the rough objects while the smooth objects are still moving through the air toward a location downstream of the trajectory of the falling rough objects.

References Cited

UNITED STATES PATENTS

| 1,192,159 | 7/1916 | Blauvelt | 209—134 X |
| 2,114,727 | 4/1938 | Thys | 209—137 X |
| 2,369,723 | 2/1945 | Denlinger | 171—14 |
| 2,612,993 | 10/1952 | Levesque | 209—136 X |
| 3,340,935 | 9/1967 | Csimma | 171—14 |

FOREIGN PATENTS 636,100   4/1950   Great Britain.

FRANK W. LUTTER, Primary Examiner

U.S. Cl. X.R.
171—17; 209—147

PO-1050
(5/69)

UNITED STATES PATENT OFFICE
CERTIFICATE OF CORRECTION

Patent No. 3,469,691    Dated September 30, 1969

Inventor(s) JOHN BOYCE

It is certified that error appears in the above-identified patent and that said Letters Patent are hereby corrected as shown below:

Column 2, line 48, change "termniates" to --terminates--.
Column 4, line 73, change "thes" to --these--. Column 5, line 70, after "mounting" insert --for these wheels is found in the previously mentioned Csimma application. Front steering wheels 42 are also provided, which wheels are mounted on a vertical adjustable frame 43, for selecting the height of the pickup mechanism A relative to the ground. The details of the front--.

SIGNED AND
SEALED
FEB 9 1971

(SEAL)
Attest:

Edward M. Fletcher, Jr.
Attesting Officer

WILLIAM E. SCHUYLER, JR.
Commissioner of Patents